UNITED STATES PATENT OFFICE.

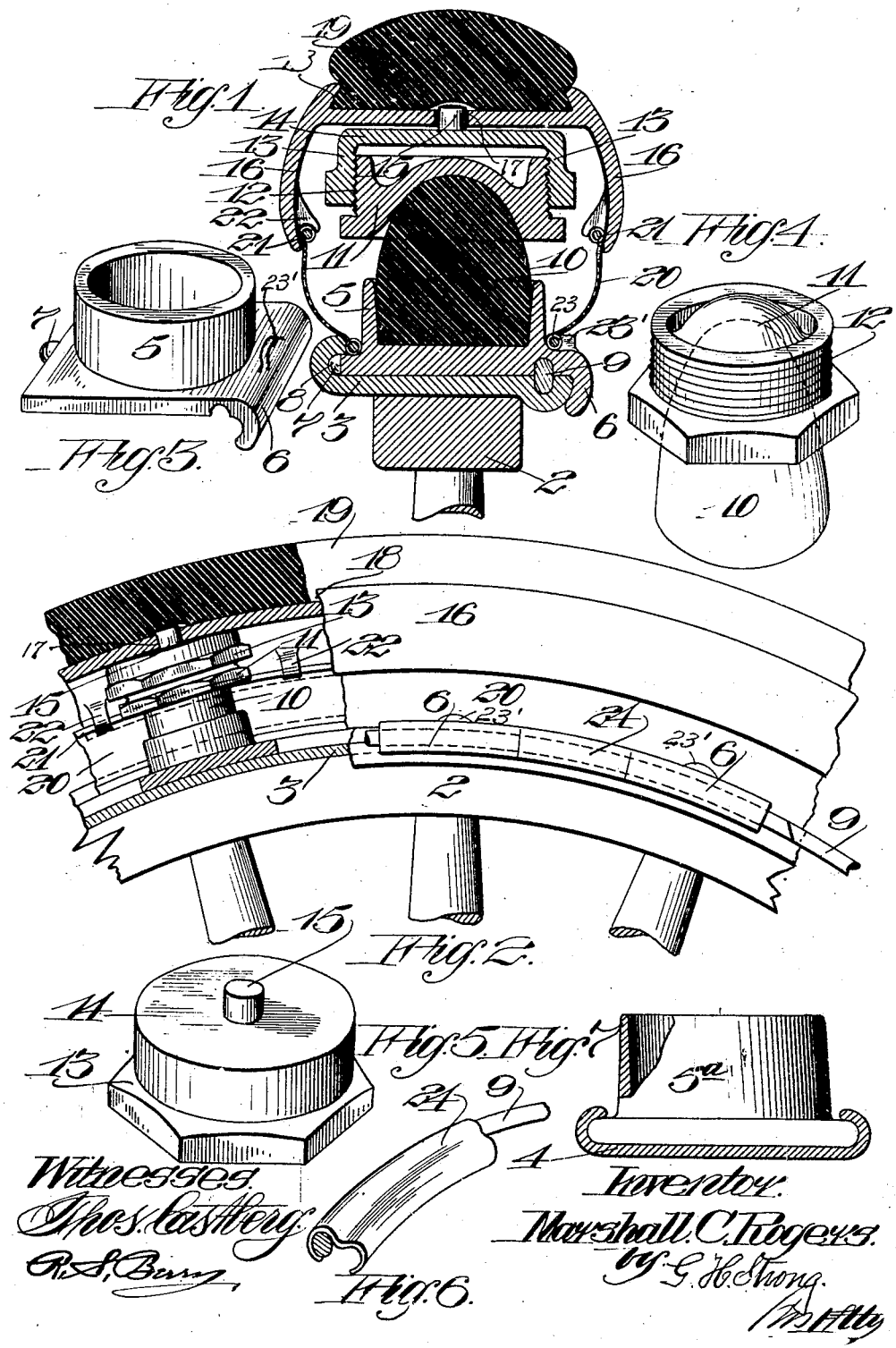

MARSHALL C. ROGERS, OF WILLIAMS, CALIFORNIA.

RESILIENT TIRE.

1,064,381. Specification of Letters Patent. Patented June 10, 1913.

Application filed February 15, 1912. Serial No. 677,848.

*To all whom it may concern:*

Be it known that I, MARSHALL C. ROGERS, a citizen of the United States, residing at Williams, in the county of Colusa and State of California, have invented new and useful Improvements in Resilient Tires, of which the following is a specification.

The present invention relates to resilient wheels.

The object of this invention is to provide a wheel structure, the design of which permits a resilient motion of the tread portion of the wheel relative to a central or hub portion; it being an object of the invention to provide a wheel eliminating to the greatest possible extent the use of any metallic springs, or of air cushions and other elements which are readily rendered inoperative. The wheel consists for the most part of substantial, metallic members so mounted with relation to each other that a substantial, durable, yet sufficiently yielding structure is obtained.

The invention consists of the parts and the construction and combination of parts as hereinafter more fully described and claimed, having reference to the accompanying drawings, in which—

Figure 1 is a transverse section of the improved wheel rim. Fig. 2 is a side elevation in partial section of the wheel rim. Fig. 3 is a perspective view of a socket or cup. Fig. 4 is a perspective view of the spring and its adjustable bushing. Fig. 5 is a perspective view of the bushing nut. Fig. 6 is a perspective view of a portion of a cup spacer. Fig. 7 is an end view of a modified form of the spring cup.

In the illustrated embodiment of the invention 2 represents the felly of a wheel, upon which may be attached a clencher ring, as 3, Fig. 1, or another form of clencher ring, as 4, Fig. 7.

At suitable intervals circumferentially around the clencher ring 3 there is provided a series of cup-like members 5 having at one side downwardly hanging flanges 6 adapted to be pressed into engagement with the adjacent edge of the clencher ring 3. On the opposite edge of the cup 5 is provided a spur or projection 7, which may be registered with a socket or depression 8 formed in the clencher flange 3. The purpose of the projection 7 is to prevent circumferential movement of the cup 5 about or on the rim 3, and in order to lock the cup 5 in place against lateral movement, a snap or lock ring 9 may be interposed between the bottom of the cup 5 and grooved surface of the clencher ring 3. In practice the snap ring is first placed upon the rim 3 and then the cups, 5, are arranged upon the rim, with the button, 7, engaging the socket, 8, of the rim. Then the cups, 5, are pressed or forced down over the snap ring, 9, with the lips or flanges, 6, against the adjacent edge of the rim, 3, so that the ring prevents the cups 5 from moving sidewise; also the cups will be held down on the seat or rim, 3, by the pressure of the rubber cushion 10.

In each of the cups 5 attached to the clencher ring 3 there is inserted a substantial, highly resilient, flexible spring member or bearing 10, which may be of a good quality of rubber or of some other material appropriate for that purpose. The lower end of the spring device or cushion 10 is substantially flat and formed cylindrically to fit snugly in the cup 5; the upper end of the cushion 10 being rounded or egg-shaped and adapted to seat in a bushing or socket member 11, externally threaded at 12 to be adjustable in a nut 13.

The nut 13 is provided with a closed end or diaphragm 14, from the center of which projects a pin 15. Surrounding the assembled wheel structure, consisting of the parts 3—5—10—12—13, is a circumferential hollow or annularly concaved rim 16 of sufficient width to substantially inclose and protect the nut 13 with its connected parts; the rim 16 being provided with a series of perforations 17 into which may project the pin 15 on the end of the nut 13.

The wheel rim 16 may be of any suitable material which is durable and substantial, and may be aluminum, bronze, or any other appropriate material. The periphery of the rim is annularly recessed, as at 18, to receive a suitable flexible wearing tread 19, which may be of rubber, composition or other desirable substance.

In assembling the wheel the several cups 5 are arranged in their respective positions on the clencher ring 3 and the spring cushions 10 arranged therein, at which time the spring seats or bushings 11 may have been screwed compactly into the nuts 13 and these assembled in order in their respective places in the rim 16. When the rim 16 has been circumferentially placed over the clencher ring 3, so that the cushions 10 spring into their respective sockets or bushings 11, the bushings are then moved outwardly in the nuts 13 by turning the latter with any suitable tool, which may be applied beneath the downward turned flanges of the rim 16.

The outward movement of the nuts 13 puts the several resilient cushions 10 under the desired state of compression, which in practice will be of such degree as to permit a sufficient movement of the outer portion of the wheel, consisting of the part 16 and the nuts 13 to and from the central portion of the wheel consisting of the felly and its associated parts.

It will be observed that by the present device I have avoided the use of metallic springs of all characters and have eliminated air cushions, which are difficult of maintenance, and substituted in lieu thereof a durable and appropriate device consisting of the resilient buffer or cushion 10, which, being compressible and expansible, provides an extremely advantageous means of obtaining a resilient wheel.

For the purpose of excluding dust, mud and other foreign material from the interior of the rim 16 and the other parts of the wheel, I introduce curtains 20 which may be of suitable flexible material, one for each side of the rim 16; each curtain being provided with outer expansible rings or springs 21 adapted to engage supporting ears 22 on the flanges of the rim 16, and each curtain having inner contractile rings or springs 23 adapted to contact into snug engagement with, and rest upon, bearings 23', which in the present instance may be at the sides of the cup 5. This curtain structure is both simple and inexpensive and may be readily removed and replaced with great facility when desired.

For the purpose of adding to the general appearance of the structure and the further function of preventing circumferential movement of the several cushion seats 5, I introduce between the facing edges of each of the seats an arcuate filler or bead 24, Fig. 6, of such transverse shape or contour as to embrace the clencher lock ring 9 and extend around the adjacent edge of the clencher ring 3.

In order to render the present improvement readily adaptable to either a detachable rim structure, such as shown in Fig. 1 at 3, or as shown in Fig. 7 at 4, I provide a slightly modified form of cup, as 5ª, Fig. 7, the edges of the base of which are conformed to the flanges of the clencher ring 4.

Having thus described my invention, what I claim and desire to secure by Letters Patent is—

1. In a vehicle tire, the combination with a central wheel structure and a clencher ring, of a plurality of upper and lower socket members, resilient buffers interposed between said members, said lower socket-members each being of cup-shape and having one side edge formed with a downwardly hanging flange adapted to be pressed into engagement with the adjacent edge of the clencher ring, and having at the opposite side edge means engaging said ring and holding the socket-member against circumferential movement.

2. In a vehicle tire, the combination with a central wheel structure, and a clencher ring, of a plurality of upper and lower socket members, resilient buffers interposed between said members, said lower socket members each being of cup-shape and having one side edge formed with a downwardly hanging flange adapted to be pressed into engagement with the adjacent edge of the clencher ring and having at the opposite side edge a projection adapted to fit a socket or depression in the clencher ring, whereby said lower socket member is held against circumferential movement.

3. In a vehicle tire, the combination with a central wheel structure, a clencher ring, and a wheel rim having a tread portion, of a plurality of upper and lower socket members, resilient buffers interposed between said members, said lower members being held to the clencher ring against circumferential movement and said upper socket members being formed of two parts one threaded on the other, one of said parts having a projection, and said wheel rim having a perforation to receive said projection.

4. An improved vehicle tire, comprising a central wheel structure, a clencher ring, a wheel rim having a tread portion, a series of lower socket members seated on the clencher ring, and means between said members and the ring for holding the members against circumferential movement, a series of upper socket members formed of two parts one of which is externally threaded and the other is internally threaded and fashioned as a nut and having means interlocking with the wheel rim, buffers interposed between the upper and lower socket members, and side curtains of flexible material provided with expansible rings adapted to engage the wheel rim and lower socket members respectively.

In testimony whereof I have hereunto set my hand in the presence of two subscribing witnesses.

MARSHALL C. ROGERS.

Witnesses:
GEORGE C. COMSTOCK,
GEORGE H. SIMMONS.